(12) United States Patent
Stednitz

(10) Patent No.: US 11,529,574 B2
(45) Date of Patent: Dec. 20, 2022

(54) PIPELINE STRAINER

(71) Applicant: Strahman Valves, Inc., Bethlehem, PA (US)

(72) Inventor: Samuel Stednitz, St. Clair, PA (US)

(73) Assignee: Strahman Valves, Inc., Bethlehem, PA (US)

( * ) Notice: Subject to any disclaimer, the term of this patent is extended or adjusted under 35 U.S.C. 154(b) by 401 days.

(21) Appl. No.: 16/723,666

(22) Filed: Dec. 20, 2019

(65) Prior Publication Data

US 2020/0197844 A1 Jun. 25, 2020

Related U.S. Application Data

(60) Provisional application No. 62/783,812, filed on Dec. 21, 2018.

(51) Int. Cl.
| | | |
|---|---|---|
| *B01D 33/073* | (2006.01) | |
| *B01D 33/42* | (2006.01) | |
| *B01D 33/72* | (2006.01) | |
| *B01D 35/02* | (2006.01) | |

(52) U.S. Cl.
CPC ........... *B01D 33/073* (2013.01); *B01D 33/42* (2013.01); *B01D 33/725* (2013.01); *B01D 35/02* (2013.01); *B01D 2201/16* (2013.01); *B01D 2201/186* (2013.01); *B01D 2201/287* (2013.01)

(58) Field of Classification Search
CPC .... B01D 33/073; B01D 33/42; B01D 33/725; B01D 35/02; B01D 35/023; B01D 2201/16; B01D 2201/186; B01D 2201/287; B01D 2201/313; B01D 29/35; B01D 29/902; B01D 46/0056
See application file for complete search history.

(56) References Cited

U.S. PATENT DOCUMENTS

| | | | | |
|---|---|---|---|---|
| 2,198,819 | A * | 4/1940 | Holm | B01D 35/02 |
| | | | | 138/37 |
| 4,036,758 | A * | 7/1977 | Combest | B01D 29/114 |
| | | | | 210/451 |
| 2016/0206982 | A1 | 7/2016 | Richter et al. | |

FOREIGN PATENT DOCUMENTS

| | | | |
|---|---|---|---|
| RU | 2469769 C1 * | 12/2012 | ........... B01D 29/117 |
| RU | 2469769 C1 | 12/2012 | |
| WO | 2013/012358 A1 | 1/2013 | |

(Continued)

OTHER PUBLICATIONS

English machine translation of RU2469769, 2012 (Year: 2012).*

(Continued)

*Primary Examiner* — Magali P Slawski
*Assistant Examiner* — Bernadette Karen McGann
(74) *Attorney, Agent, or Firm* — Barley Snyder

(57) ABSTRACT

A pipeline strainer is provided having a cavity, a screen assembly disposed in the cavity, the screen assembly having an open first end and an open second end and a screen axis extending from the open first end to the open second end, a fluid inlet arranged at the open first end of the screen assembly, such that the fluid inlet is open to an interior of the screen assembly, a fluid outlet adjacent the open first end of the screen assembly. The fluid outlet is open to a straining surface of the screen assembly. A fluid axis extends from the fluid inlet to the fluid outlet where the fluid axis crosses the screen axis at or near the fluid inlet.

12 Claims, 8 Drawing Sheets

(56) References Cited

FOREIGN PATENT DOCUMENTS

WO     WO-2018215788 A1 * 11/2018 ............. B01D 29/33

OTHER PUBLICATIONS

International Search Report issued for corresponding International Patent Application No. PCT/US 2019/068055, dated Mar. 19, 2020.
Written Opinion issued by the International Searching Authority for corresponding International Patent Application No. PCT/US 2019/068055, dated Mar. 19, 2020.

* cited by examiner

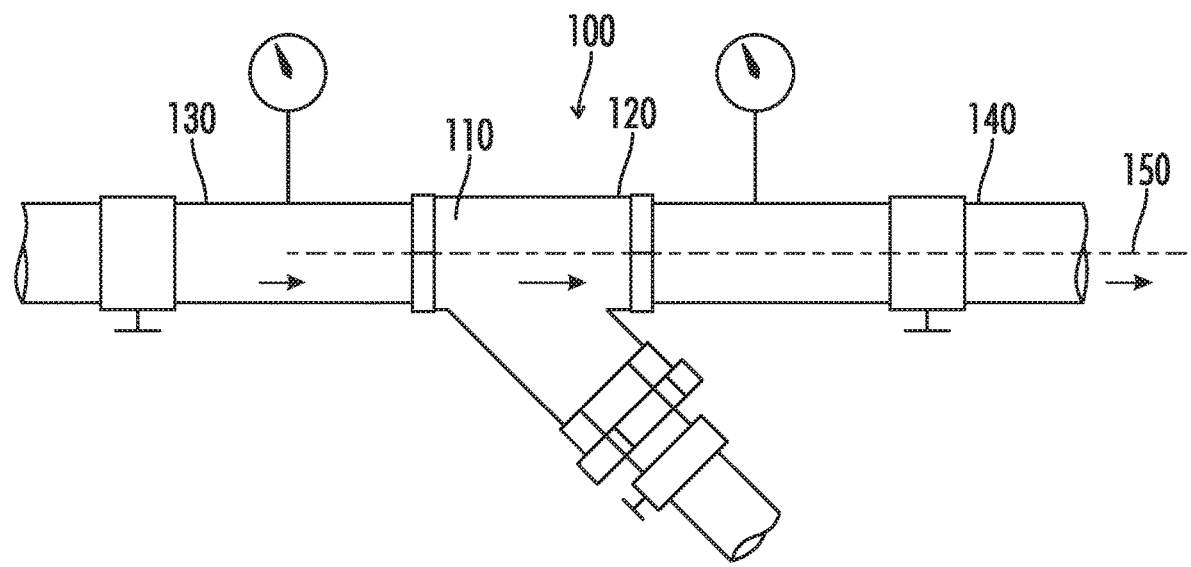
*FIG. 1*
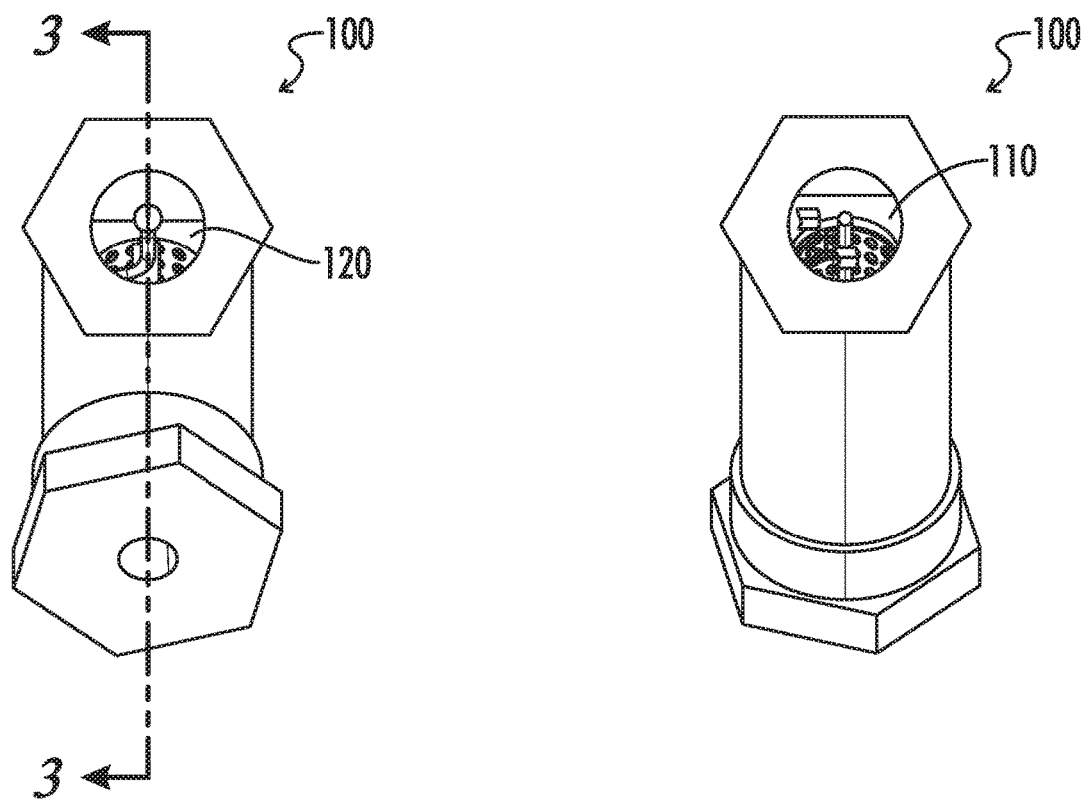
*FIG. 2A*  *FIG. 2B*

PIPELINE STRAINER

CROSS REFERENCE TO RELATED APPLICATIONS

This application claims the benefit of U.S. Provisional Patent Application No. 62/783,812 filed on Dec. 21, 2018. The contents of U.S. Provisional Patent Application 62/783,812 are hereby incorporated by reference.

FIELD OF THE INVENTION

This disclosure relates to strainers for fluid lines, and pipeline strainers, such as Y strainers, for steam lines in particular.

BACKGROUND

Pipeline strainers are used for removing debris from fluid lines. Such a strainer mechanically removes solids from a flowing fluid using a straining element. Typically, the solids are retained in the straining element while the fluid continues along the pipeline for use downstream in the fluid system. Removing solid debris from fluids helps protect pumps, steam traps, nozzles, and other pipeline equipment. Removing such debris further promotes a reduction in impurities in fluid flow.

Typically, the straining element is a tubular, or cylindrical screen positioned adjacent a drain or cleanout valve that can be opened to remove the debris. As debris builds up in the straining element, such debris may obstruct flow as it clogs the straining element. Accordingly, removal of debris at regular intervals may be required to allow the strainer to provide consistent flow.

One common design for such pipeline strainers is a Y strainer design. Such a strainer design has a strainer, typically provided in a cavity, extending at an oblique angle relative to the pipeline. In such designs, debris typically collects in the straining element towards a far end of the cavity as well as on the screen adjacent a fluid outlet. While the debris collecting at the far end of the cavity must be removed, debris collecting on the screen may obstruct flow while the cavity continues to have space for such debris, thereby prematurely obstructing the fluid outlet and leading to an unwanted excessive pressure drop in the fluid line.

In any pipeline strainer, the size of perforations in the straining element has a substantial effect on the performance of the strainer. Smaller holes will result in frequent cleaning and excessive pressure drop, while larger holes will allow larger debris to pass through unimpeded. Accordingly, because screens typically have fixed hole sizes, a straining element must be carefully selected for specific tasks, and changing operating conditions may result in a significant drop in performance. An improperly selected straining element may result in frequent clogging and increased cleaning requirements.

There is a need for pipeline strainers that can operate for longer time periods between cleaning intervals. There is a further need for a standard strainer that allows for adjustments for different implementations.

SUMMARY

An embodiment of the present device is a pipeline strainer for removing debris from flowing fluid using a straining element. Commonly used strainers have a Y design with a straining element having fixed hole sizes that is associated with frequent cleaning and clogging. By using the present pipeline strainer, it is possible to adjust the strainer for various applications that extends the time between cleaning of the pipeline strainer.

One embodiment is a pipeline strainer comprising a cavity, a screen assembly disposed in the cavity, the screen assembly having an open first end and an open second end, and a screen axis extending from the open first end to the open second end. A fluid inlet may be arranged at the open first end of the screen assembly, such that the fluid inlet is open to an interior of the screen assembly, and a fluid outlet may be arranged adjacent the open first end of the screen assembly, wherein the fluid outlet is open to a straining surface of the screen assembly.

A fluid axis extends from the fluid inlet to the fluid outlet, and the fluid axis crosses the screen axis at or near the fluid inlet.

During operation of the strainer, fluid flows within the first pipe segment and enters the pipeline strainer at the fluid inlet.

In some embodiments, the screen assembly and the cavity are tubular or cylindrical. In some embodiments, the screen assembly contains holes of the same size on its surface distributed in a pattern.

In some embodiments, the pipeline strainer provides first and second screens containing holes of the same size. In such embodiments the first and second screens may be nested, such that one of the screens is within the second screen. In such an embodiment, the first screen may be movable relative to the second screen in order to offset the holes of the first screen relative to the holes of the second screen. The screen assembly then has a hole size corresponding to the overlapping portions of the holes of the first and second screen.

In some embodiments, the first screen is indexed relative to the second screen to provide a maximum and minimum hole size for the screen assembly. The maximum hole size is then equal to the hole size of each of the first and second screen, and the minimum hole size is smaller than the hole size of either the first or second screen.

The pipeline strainer may further comprise a distribution baffle, fixed to one of the screens and located adjacent the fluid outlet, obstructing flow of fluid from an interior of the screen assembly towards the fluid outlet. In such an embodiment, the first and second screens are indexed by way of the distribution baffle.

In addition, in some embodiments, the cavity is tubular and the screen assembly is nested inside the cavity. The pipeline strainer assembly may then provides a baffle, which may take a spiral form, which causes fluid outside the screen to follow a spiral which in turn causes fluid within the screen assembly to form a vortex. A combination of the distribution baffle and the spiral baffle on the interior surface causes fluid in the strainer to take circuitous roads, distributing debris evenly along an inside surface of the screen assembly.

In some embodiments, the pipeline strainer further comprises a first pipe segment extending from the fluid inlet and a second pipe segment extending from the fluid outlet, and during use, fluid flows along the fluid axis in the first pipe segment and is deflected towards the screen axis at the fluid inlet and ultimately continues out the fluid outlet into the second pipe segment along the fluid axis. In such an embodiment, a fluid pressure in the second pipe segment is lower than a fluid pressure in the first pipe segment. Further, such an embodiment pay provide the first pipe segment with an enlarged segment and the second pipe segment with an enlarged segment, where the enlarged segment of the second pipe segment is larger than the enlarged segment of the first pipe segment.

Further, the pipeline strainer may contain a drain through which debris can be removed from the cavity. In some embodiments, the drain comprises an intermediate cleanout valve in order to remove smaller debris without opening the valve.

Some embodiments of the invention provides a storage segment of the screen assembly, that does not have holes, adjacent the second end. In such embodiment the holes are evenly distributed in a pattern, along the entire surface of the screen assembly, except the storage segment. In such arrangement, debris would gather against the drain, preventing clogging of the holes.

Generally, the first and the second screen can operate as a fully open configuration, where holes of the first and second screen overlap, in which combined holes of the screen assembly are equal to the size of the holes of each screen, or in a closed configuration, which is generally a half open position, with the sizes of the holes reduced.

BRIEF DESCRIPTION OF THE DRAWINGS

FIG. 1 shows a pipeline strainer according to the present disclosure in the context of a pipeline assembly.

FIG. 2A shows a back view of a pipeline strainer according to the present disclosure.

FIG. 2B shows a front view of the pipeline strainer of FIG. 2.

DETAILED DESCRIPTION OF THE PREFERRED EMBODIMENTS

Figure 3:
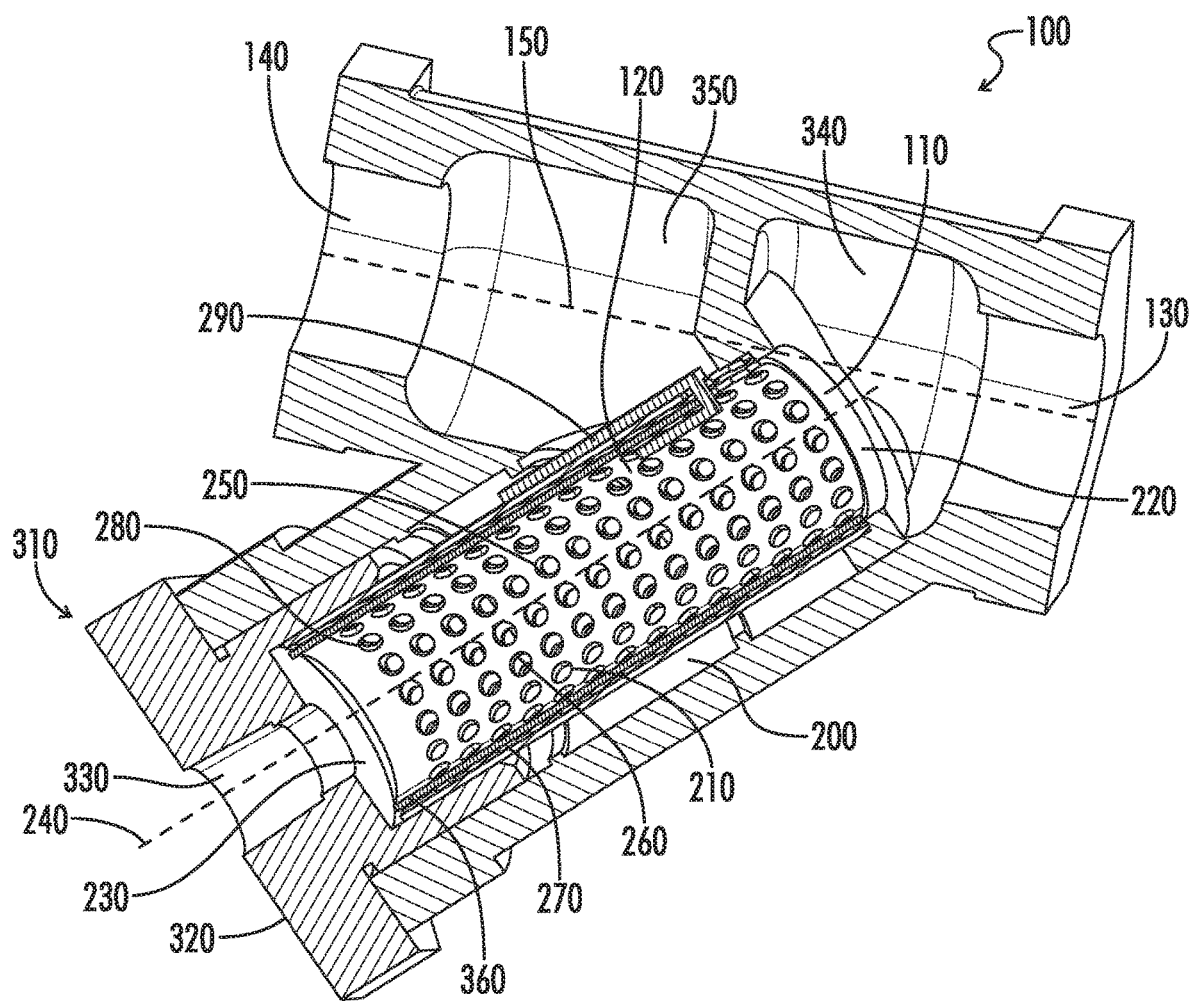
FIG. 3 shows a partially sectioned view of the pipeline strainer of FIG. 2A, sectioned along line 3-3 of FIG. 2A.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Disclosed herein is a pipeline strainer 100, shown as a Y strainer, for removing debris from flowing fluid using a straining element. The fluid in the pipeline may be either liquid or gaseous, depending on the application being considered.

FIG. 1 shows a pipeline strainer 100 according to the present disclosure in the context of a pipeline assembly. As shown, the pipeline strainer 100 is provided with a fluid inlet 110 and a fluid outlet 120, with a first pipe segment 130 extending from the fluid inlet and a second pipe segment 140 extending from the fluid outlet 120. In use, fluid flows along a fluid axis 150 within the first pipe segment 130 and enters the pipeline strainer 100 at the fluid inlet 110. After debris is removed from the fluid, the fluid exits the pipeline strainer 100 by way of the fluid outlet 120 and continues along the fluid axis 150 within the second pipe segment 140.

The fluid axis 150 typically extends from the fluid inlet 110 to the fluid outlet 120. However, as shown below, the fluid flow may be obstructed such that fluid is deflected into the pipeline strainer instead of continuing along a direct path in the direction of the fluid axis 150.

FIG. 2A shows a back view of a pipeline strainer 100 according to the present disclosure, FIG. 2B shows a front view of the pipeline strainer, and FIG. 3 shows a partially sectioned view of the pipeline strainer of FIG. 2A-B, sectioned along line A-A of FIG. 2A. As shown, the pipeline strainer 100 has an inlet 110 and an outlet 120 and a fluid axis 150 extending from the inlet to the outlet.

The pipeline strainer 100 further comprises a cavity 200 and a screen assembly 210 disposed within the cavity 200. The screen assembly 210 and the cavity 200 are each typically tubular, or cylindrical, and the screen assembly is nested within the cavity.

The screen assembly 210 has an open first end 220 and an open second end 230 and a screen axis 240 extending from the first end to the second end. The fluid inlet 110 is arranged at the open first end 220 of the screen assembly 210, such that the fluid inlet is open to an interior of the screen assembly, while the fluid outlet 120 is adjacent the open first end 220 of the screen assembly, such that the fluid outlet is open to a straining surface 250 of the screen assembly 210.

As shown, the screen axis 240 is arranged obliquely relative to the fluid axis 150, and the two axes are therefore not parallel. Instead, the fluid axis 150 crosses the screen axis 240 at or near the fluid inlet 110. As can be seen, the fluid axis 150 may not actually pass through the fluid inlet 110 and the fluid outlet 120, but provides a path from the first pipe segment 130 to the second pipe segment 140, with the inlet 110 drawing fluid from the first pipe segment 130 and the fluid outlet 120 depositing fluid into the second pipe segment 140. Accordingly, when referring to a fluid axis 150 extending from the fluid inlet 110 to the fluid outlet 120, it will be understood to reference the scenario illustrated where the fluid axis 150 passes the mouth of the fluid inlet 110.

Figure 4:
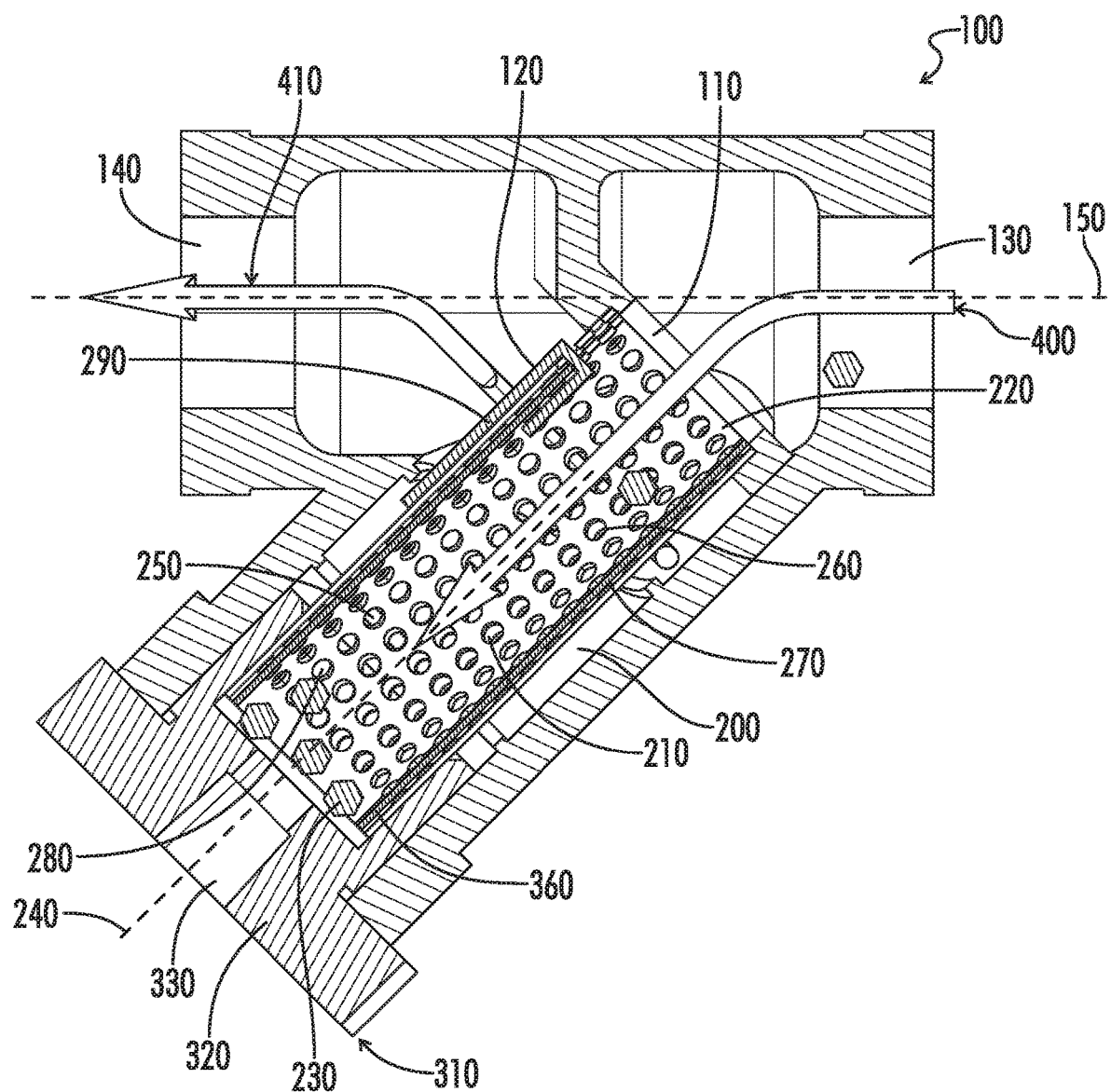
FIG. 4 shows a sectioned view of the pipeline strainer of FIG. 2A taken along line A-A of FIG. 2A and showing flow direction.

Accordingly, as shown in FIG. 4, fluid flows along the fluid axis 150 and is deflected through the fluid inlet 110 into the interior of the screen assembly 210 along the screen axis 240. This is shown as fluid path 400. Once fluid circulates within the screen assembly 210 it then exits through the fluid outlet 120, as shown in fluid path 410.

Figure 6A:
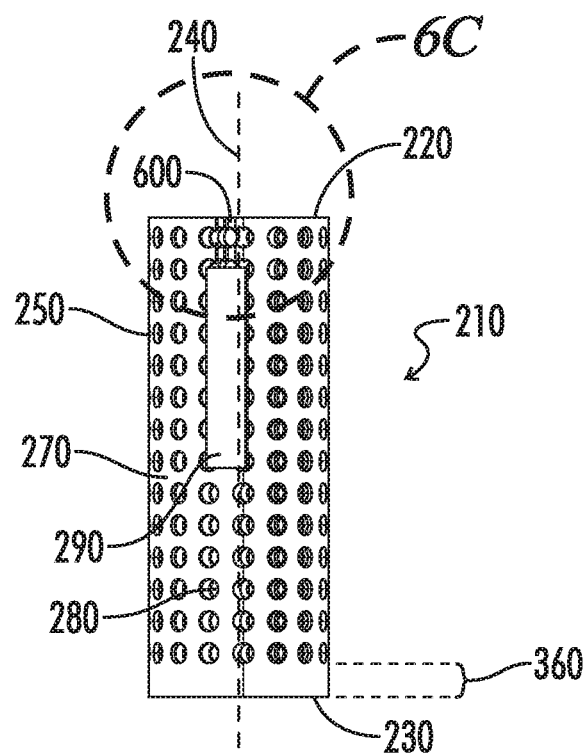
FIG. 6A shows a screen assembly for use in the pipeline strainer of FIG. 2A in a first configuration.

The screen assembly 210 comprises a first screen 260 and a second screen 270, with the first screen being nested within the second screen. Each of the first screen 260 and the second screen 270 are perforated with holes 280. In the embodiment shown, the holes 280 of the first screen 260 and the holes of the second screen 270 are the same size. As discussed below in more detail, in reference to FIGS. 6-8, the first screen 260 is movable relative to the second screen 270 such that the holes 280 in each screen can either be aligned, as shown in FIG. 6A, or offset, as shown in FIG. 8A.

The screen assembly 210 further comprises a distribution baffle 290 fixed to one of the screens 260, 270, such that it is positioned at the fluid outlet 120, thereby obstructing flow. The distribution baffle 290 therefore prevents fluid from traveling directly from the fluid inlet 110 to the fluid outlet 120, instead forcing the fluid to circulate within the screen assembly 210. In addition to obstructing flow, the distribution baffle may index the first screen 260 relative to the second screen 270. This is described in more detail below.

Figure 5:
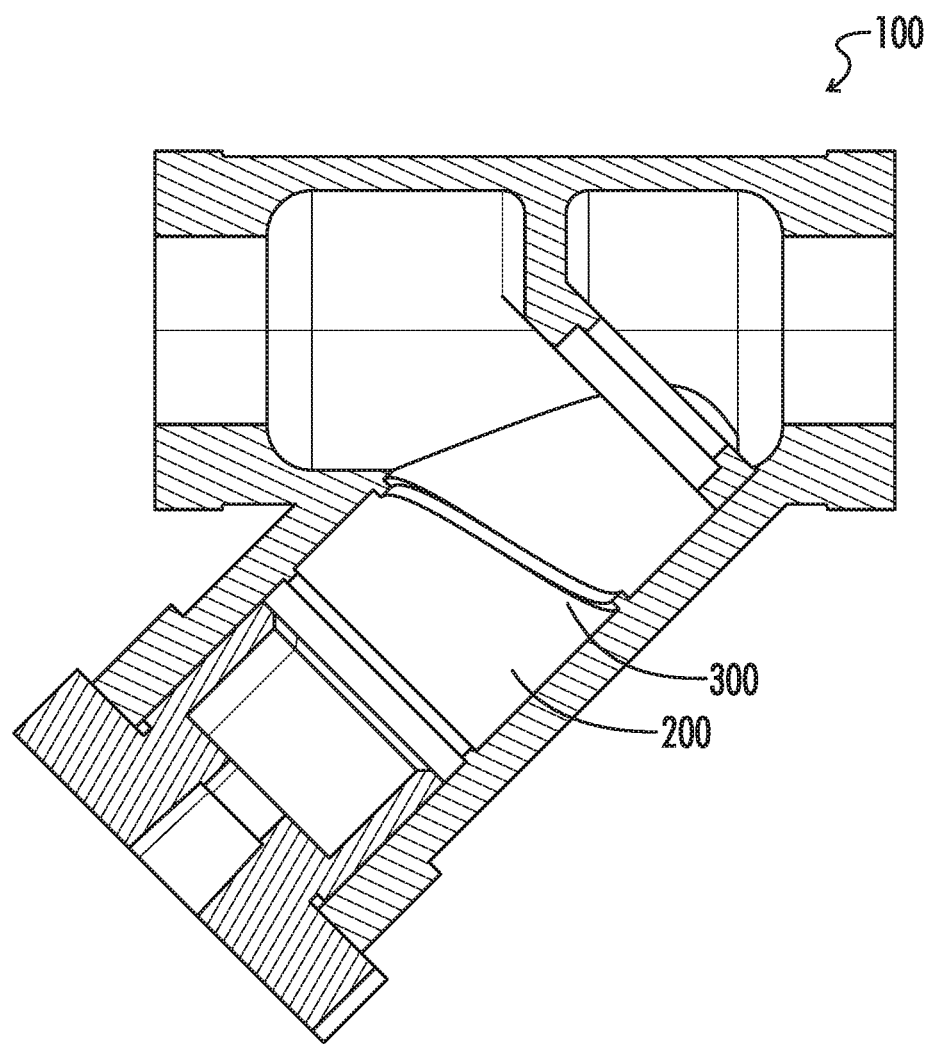
FIG. 5 shows the partially sectioned view of FIG. 3 with a screen assembly removed.
Figure 9:
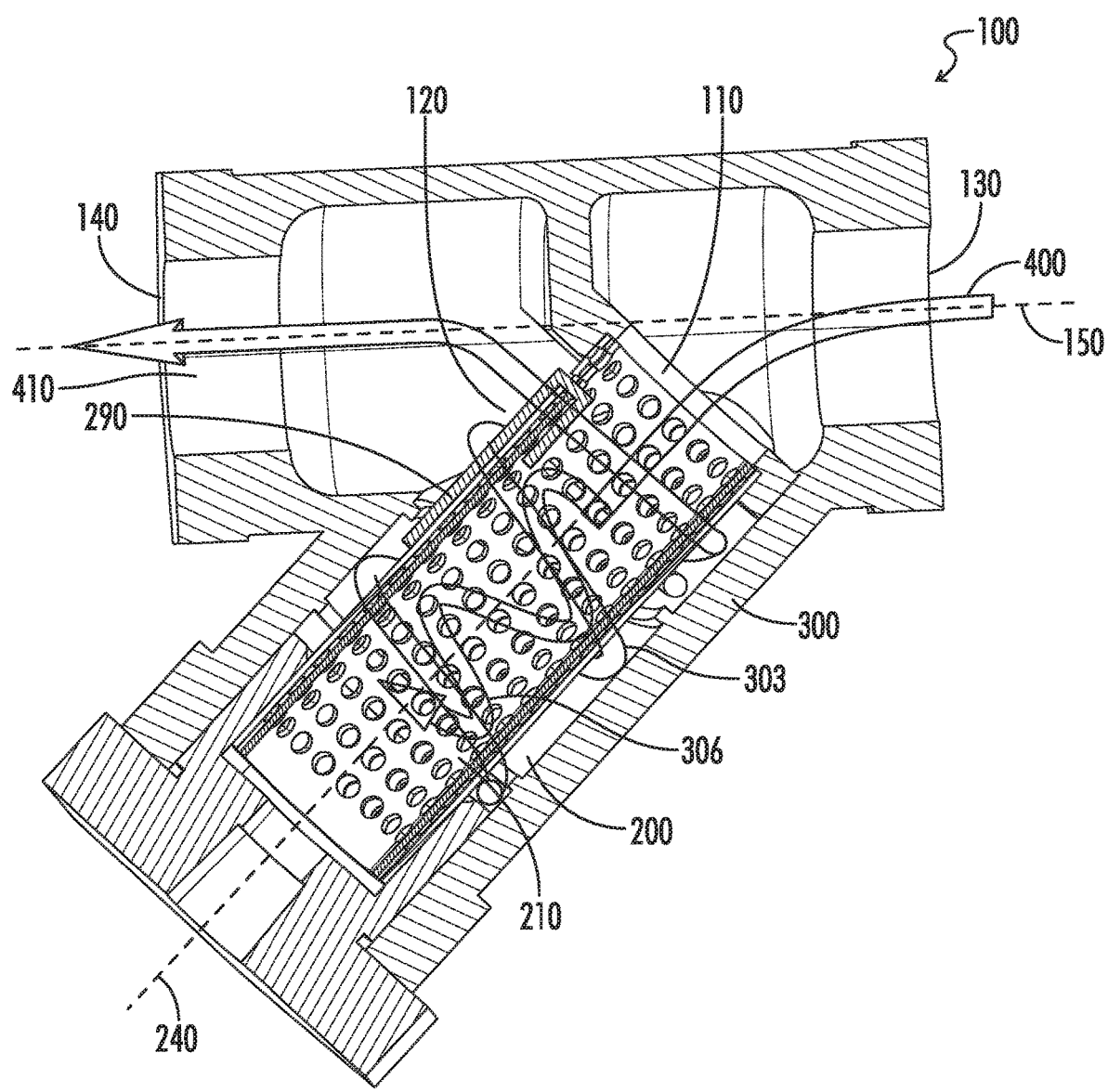
FIG. 9 shows a sectioned view of the pipeline strainer of FIG. 2 showing a flow path of fluid.

FIG. 5 shows the partially sectioned view of the pipeline strainer 100 of FIG. 3 with a screen assembly 210 removed. As shown in FIG. 5, the cavity 200 has an interior surface which further comprises a baffle 300 for directing flow within the cavity. The baffle 300 may take a spiral form, such that it causes fluid outside the screen to follow a spiral 303, which in turn causes fluid within the screen assembly 210 to form a vortex 306. As shown in FIG. 9, the combination of the first baffle 290 at the fluid outlet and the spiral baffle 300 on the interior surface of the cavity 200 causes fluid in the pipeline strainer 100 to take a circuitous path 400, 303, 306, 410, thereby distributing debris evenly along an inside surface of the screen assembly. This results in less debris clogging the screen assembly 210 at the fluid outlet 210, thereby allowing for longer clean out intervals.

The pipeline strainer 100 further comprises a drain 310 through which debris can be removed from the cavity 200. Such a drain 310 is typically located at the second end 230 of the screen assembly 210 at the end of the cavity 200 opposite the fluid inlet 210. In order to fully clean the pipeline strainer 100, or to remove or adjust the screen assembly 210, the drain may be provided with a threaded plug 320 having approximately the same diameter as the cavity 200. In some embodiments, the drain may be provided with an intermediate cleanout valve 330 along a smaller opening, such as a ¼ inch diameter opening, in order to remove smaller debris without fully opening the valve and disassembling the pipeline strainer.

In some embodiments, the screen assembly 210 may be provided with a storage segment 360. This may be a segment of the screen assembly 210 adjacent the second end 230 that does not have holes 280. In such an embodiment, the holes 280 would be distributed evenly, taking the form of a pattern, along the entire surface of the screen assembly 210 other than in the storage segment 360. Debris within the storage segment would rest against or near the drain 210, and it would be shielded from the vortex within the screen assembly 210 by the non-perforated walls of the assembly. In this way, debris would collect against the drain 210, rather than ultimately clogging the holes 280. Accordingly, the storage segment 360 forms a well adjacent the clean out valve 310 in the cavity 200.

Typically, the pipeline strainer 100 generates a pressure drop between the first pipe segment 130 and the second pipe segment 140, as fluid flows along the fluid axis 150. Accordingly, the fluid pressure in the second pipe segment 140 is lower than the fluid pressure in the first pipe segment 130. In some embodiments, the first pipe segment 130 is provided with a first enlarged segment 340 adjacent the fluid inlet 110 and the second pipe segment 140 is provided with a second enlarged segment 350 adjacent the fluid outlet 120. The pressure differential between the first pipe segment 130 and the second pipe segment 140 may then be adjusted by varying the sizes of the enlarged segments 340, 350. By creating a larger interior volume in the second enlarged segment 350, the pressure drop may be reduced.

Figure 6B:
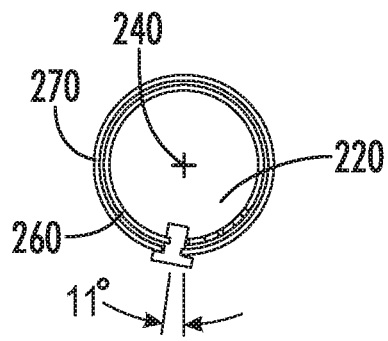
FIG. 6B shows a top view of the screen assembly of FIG. 6A.
Figure 6C:
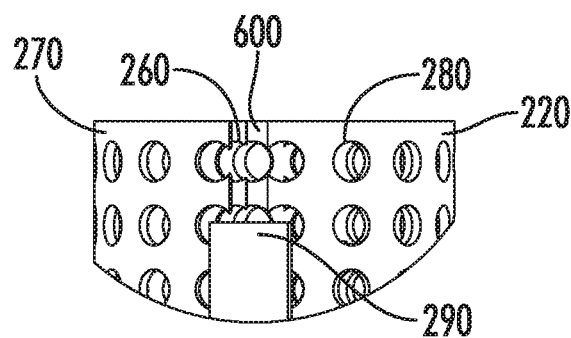
FIG. 6C shows an enlarged view of segment B of FIG. 6A.
Figure 7A:
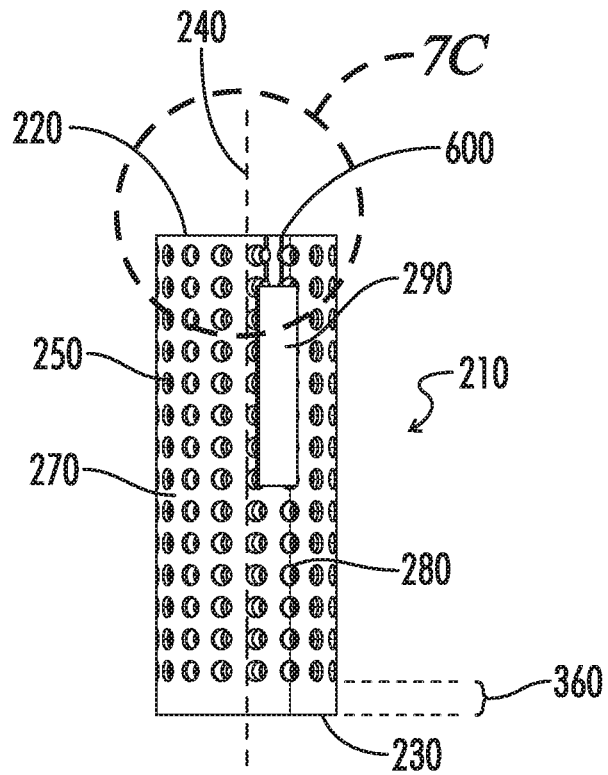
FIG. 7A shows a screen assembly for use in the pipeline strainer of FIG. 2 in a second configuration.
Figure 7B:
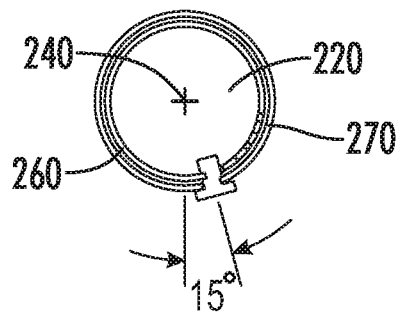
FIG. 7B shows a top view of the screen assembly of FIG. 7A.
Figure 7C:
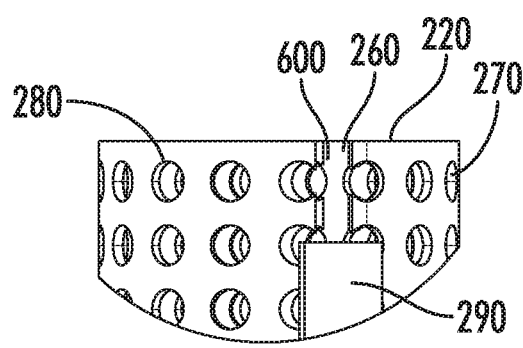
FIG. 7C shows an enlarged view of segment B of FIG. 7A.
Figure 8A:
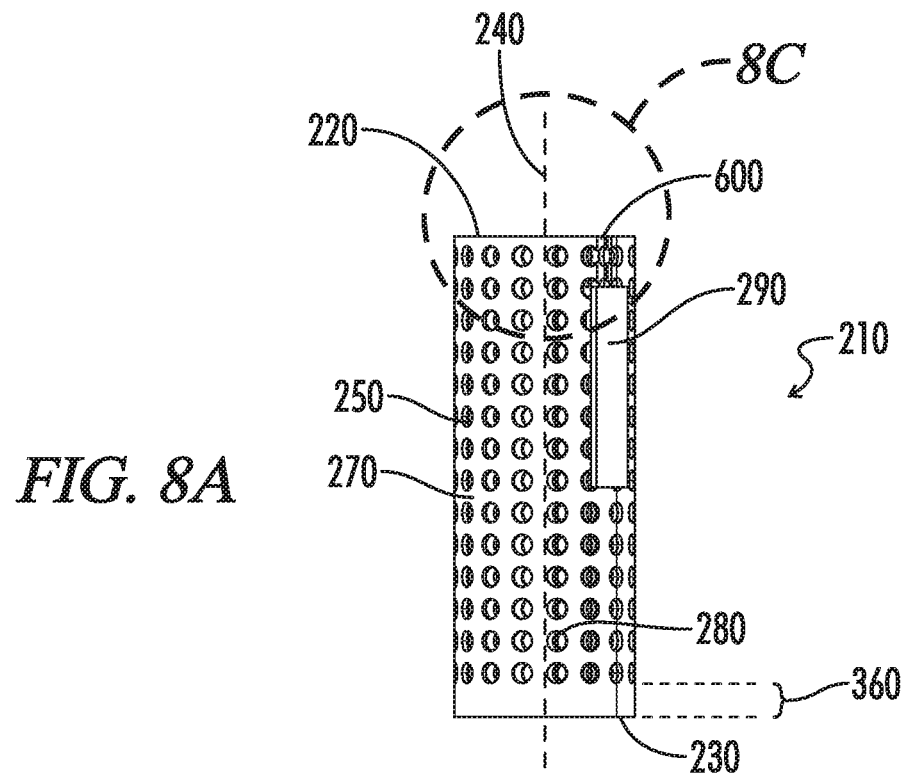
FIG. 8A shows a screen assembly for use in the pipeline strainer of FIG. 2 in a third configuration.
Figure 8B:
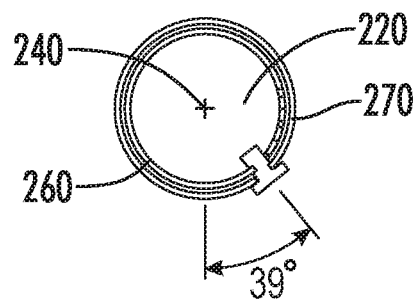
FIG. 8B shows a top view of the screen assembly of FIG. 8A.
Figure 8C:
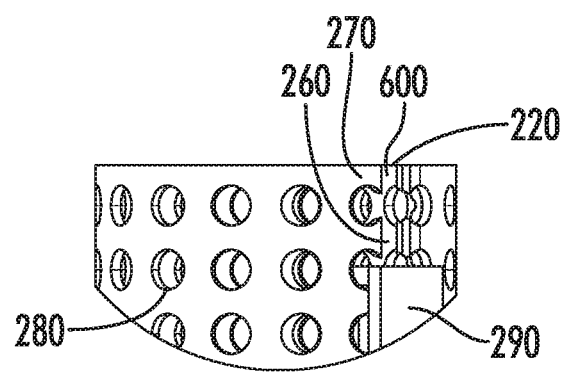
FIG. 8C shows an enlarged view of segment B of FIG. 8A.

FIGS. 6A, 7A, and 8A show the screen assembly 210 for use in the pipeline strainer 100 of FIG. 2 in a first, second, and third configuration respectively. FIGS. 6B, 7B, and 8B show top views of the screen assembly 210 in each configuration, and FIGS. 6C, 7C, and 8C show enlarged view of segments of the screen assembly 210 in each configuration.

The screen assembly 210 has an open first end 220, an open second end 230, and a screen axis 240 extending from the first end to the second end. The screen assembly 210 is typically tubular, or cylindrical, and has an interior and a straining surface 250. The screen assembly typically comprises a first screen 260 and a second screen 270, with the first screen being nested within the second screen. Each of the first and second screen 260, 270 are perforated with holes 280. In the embodiment shown, the holes 280 in each of the first and second screens 260, 270 are sized identically. However, in some embodiments, different sizes may be used on each screen. As shown, the first screen 260 is movable relative to the second screen 270 such that the holes 280 in each screen can either be aligned, as in the first configuration shown in FIG. 6A or offset, as in the third configuration shown in FIG. 8A.

The screen assembly 210 further comprises a distribution baffle 290, shown fixed to the first screen 260. The distribution baffle 290 may be used to index the first screen 260 relative to the second screen 270. Accordingly, when the distribution baffle 290 prevents rotation of the first screen 260 relative to the second screen 270 in a first direction, the screen assembly 210 is in the first configuration, shown in FIG. 6A. The positioning of the baffle in such a scenario is shown in FIG. 6B, while a closeup of an indexing notch 600 in the second screen 270 is shown in FIG. 6C. Similarly, when the distribution baffle 290 prevents the rotation of the first screen 260 relative to the second screen 270 in a second direction, the screen assembly 210 is in the third configuration, shown in FIG. 8A. The positioning of the baffle in such a scenario is shown in FIG. 8B, while a closeup of the indexing notch 600 is shown in FIG. 8C.

The first configuration represents a fully open configuration, with the holes 280 of the first screen 260 perfectly overlapping the holes of the second screen 270, such that the combined holes of the screen assembly 210 are equal to the size of the holes of each screen. In contrast, the third configuration represents a closed configuration. The closed configuration is typically a partially open position set as the maximally closed position by a manufacturer of the pipeline strainer 100. Such setting can be by modifying the indexing described herein. In the embodiment shown, the closed configuration is set at approximately half open, with the holes reduced to approximately half their original size.

FIGS. 7A-C represent a partially open configuration between that shown in FIGS. 6A-C and that shown in 8A-C.

As shown in FIGS. 6A, 7A, and 8A, the screen assembly 210 may be provided with a storage segment 360. This may be a segment of the screen assembly 210 adjacent the second end 230 that does not have holes 280. In such an embodiment, the holes 280 are distributed evenly, taking the form of a pattern, along the entire surface of the screen assembly 210 other than in the storage segment 360. Debris within the storage segment would rest against or near the drain 210, shown in FIGS. 3-5, and would be shielded within the screen assembly 210 by the non-perforated walls of the assembly. In this way, debris would collect against the drain 210, rather than ultimately clogging the holes 280. Accordingly, the storage segment 360 forms a well adjacent the clean out valve 310 in the cavity 200.

FIG. 9 shows a sectioned view of the pipeline strainer 100 of FIG. 2 showing a flow path of fluid within the screen assembly 210.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A pipeline strainer comprising:
   a cavity;
   a screen assembly disposed in the cavity, the screen assembly having an open first end and an open second end, the screen assembly includes a first screen and a second screen, the first and second screens each being perforated with holes having the same hole diameter, the first and second screens are nested tubular screens such that the first screen is within the second screen, the first screen is movable relative to the second screen in order to offset the holes of the first screen relative to the holes of the second screen, such that the screen assembly has a hole size corresponding to the overlapping portions of the holes of the first and second screen, and a screen axis extending from the open first end to the open second end;
   a fluid inlet arranged at the open first end of the screen assembly, such that the fluid inlet is open to an interior of the screen assembly;
   a fluid outlet adjacent the open first end of the screen assembly, wherein the fluid outlet is open to a straining surface of the screen assembly; and
   a fluid axis extending from the fluid inlet to the fluid outlet;
   wherein the fluid axis crosses the screen axis at or near the fluid inlet.

2. The pipeline strainer of claim 1, wherein the screen assembly is tubular.

3. The pipeline strainer of claim 2, wherein the first screen is indexed relative to the second screen to provide a maximum and minimum hole size for the screen assembly, wherein the maximum hole size is equal to the hole size of each of the first and second screen, and wherein the minimum hole size is smaller than the hole size of either the first or second screen.

4. The pipeline strainer of claim 3, further comprising a distribution baffle on the screen assembly adjacent the fluid outlet obstructing fluid flow from an interior of the screen assembly towards the fluid outlet.

5. The pipeline strainer of claim 4, wherein the distribution baffle is fixed to one of the first and second screens and passes through the other of the first and second screens such that the first and second screens are indexed by way of the distribution baffle.

6. The pipeline strainer of claim 2, wherein the cavity is tubular with the open first end to the fluid inlet, and wherein the screen assembly is nested inside the cavity, the pipeline strainer further comprising a spiral baffle forming a spiral on an inside surface of the cavity and outside the screen assembly.

7. The pipeline strainer of claim 1, further comprising a distribution baffle on the screen assembly adjacent the fluid outlet obstructing fluid flow from an interior of the screen assembly towards the fluid outlet.

8. The pipeline strainer of claim 1, further comprising a first pipe segment extending from the fluid inlet and a second pipe segment extending from the fluid outlet, and wherein fluid flows along the fluid axis in the first pipe segment and is deflected towards the screen axis at the fluid inlet and ultimately continues out the fluid outlet into the second pipe segment along the fluid axis.

9. The pipeline strainer of claim 8, wherein a fluid pressure in the second pipe segment is lower than a fluid pressure in the first pipe segment.

10. The pipeline strainer of claim 9, wherein the first pipe segment has a first enlarged segment adjacent the fluid inlet and the second pipe segment has a second enlarged segment adjacent the fluid outlet, and wherein the second enlarged segment is larger than the first enlarged segment.

11. The pipeline strainer of claim 1, wherein the screen assembly has a storage segment adjacent the open second end and a straining segment, and wherein the straining segment is perforated with a patterned plurality of holes, and wherein the storage segment is not perforated.

12. The pipeline strainer of claim 11, wherein the screen assembly is tubular and wherein the storage segment forms a well adjacent a clean out valve in the cavity.

* * * * *